United States Patent [19]
Green

[11] Patent Number: 5,658,128
[45] Date of Patent: Aug. 19, 1997

[54] BOILING POT OVERFLOW PREVENTION APPARATUS

[76] Inventor: James D. Green, 631 W. Bedford Ave., Clovis, Calif. 93611

[21] Appl. No.: 519,254

[22] Filed: Aug. 25, 1995

[51] Int. Cl.$^6$ ...................................................... F03B 13/00
[52] U.S. Cl. ........................ 415/121.3; 417/234; 417/411
[58] Field of Search ........................... 415/121.3; 416/63, 416/146 R; 417/411, 234

[56] References Cited

U.S. PATENT DOCUMENTS

| | | | |
|---|---|---|---|
| 1,330,547 | 2/1920 | Mehlhaf | 415/212.1 |
| 2,909,316 | 10/1959 | Prohaczha et al. | 416/63 |
| 3,216,650 | 11/1965 | Thyreen | 417/234 |
| 3,455,102 | 7/1969 | Wolf | 415/121.3 |
| 3,647,323 | 3/1972 | Thomas | 417/234 |
| 3,730,167 | 5/1973 | Desarzens . | |
| 4,044,750 | 8/1977 | Zeigler | 417/411 |
| 4,157,707 | 6/1979 | Schwind et al. . | |
| 5,033,453 | 7/1991 | Loyd et al. . | |
| 5,115,566 | 5/1992 | Zeitlin | 417/411 |
| 5,181,836 | 1/1993 | Zeitlin | 417/411 X |
| 5,193,524 | 3/1993 | Loyd et al. . | |

*Primary Examiner*—Edward K. Look
*Attorney, Agent, or Firm*—David L. Volk; John D. Gugliotta

[57] ABSTRACT

A boiling pot over flow prevention apparatus is disclosed comprised of a flexible, directional nozzle focussing a direct stream of cool air directly downward into a boiling pot. A stabilized a base is provided to contain a fan unit, and has inlet vent structures. The fan unit is battery operated and is activated to draw cool air into the inlet vent structures and out through the flexible, directional nozzle and through a focusing aperture. When placed next to a boiling pot the flexible, directional nozzle can be conformed to direct an airflow downward into the pot. By activating the fan unit a smooth steady stream of cool air can be drawn in and directed into the pot. This air flow operates both to disburse the foam that is generated as well as to stabilizing and maintaining the heat flux through and out from the top of the boiling pot.

1 Claim, 4 Drawing Sheets

BOILING POT OVERFLOW PREVENTION APPARATUS

BACKGROUND OF THE INVENTION

1. Field of the Invention

The present invention relates generally to cooking pots and, more particularly, to an apparatus to eliminate the boiling over of food in said pots.

2. Description of the Related Art

Many complex and different methods are known in the related art to prevent food from boiling over within a cooking pot. For example, in U.S. Pat. No. 5,193,524 issued in the name Loyd et al., an over flow cooking pot assembly is disclosed. Also, in U.S. Pat. No. 5,003,453 also issued in the name of Loyd et al., another over flow cooking pot assembly is disclosed. In both of the above Loyd et al. references, pots having a variable diameter are disclosed and are utilized to prevent overflow of boiling food. Typical of both the Loyd et al. references, an enlarged increased diameter section of the pot at the upper end is used to accommodate the increased volume of water and foam which result when boiling food boils over. An obvious problem associated with both of these references is that each discloses a customize designed utensil that cannot be used with existing cookware.

Also in U.S. Pat. No. 4,157,707, issued in the name of Schwind et al., an overflow preventing kitchen utensil is disclosed. The utensil described in the Schwind et al. reference is adapted to be positioned on a rim of a cleaning vessel and has two annular channels, one open toward the center and the other open towards the top. The upper wall of the first channel defines the bottom of the second channel. A plurality of apertures in the bottom of the second channel communicate with the first channel, these apertures being closer to the outer than to the inner wall of the second channel. Among the other problems associated with such a design, a device as disclosed in the Schwind et al. reference must be manufactured to a fixed diameter, and therefore cannot be adapted, as the need arises, to use with pots of different sizes.

Finally, in U.S. Pat. No. 3,730,167 issued in the name Desarzens, a non-boil over cooking assembly is disclosed. As disclosed in the Desarzens reference, a saucepan is combined with a generally conical safety funnel, which is detachably secured thereto. The funnel appears to act essentially as an inner heating vessel, allowing food which may boil over to be directed by the cone-shape into the volume between the outer edge of the funnel and the inner edge of the saucepan. Once again, such a design cannot be adapted, as the need arises, to use with pots of different sizes.

A common problem with all the above prior art references occurs in that they attempt to correct the effects of a pot boil over rather than a cause. All the above cited references provide for methods and manners to contain and direct boil overs rather than to prevent them initially. It has been found that one cause of boilovers is the result from the increased insulative effect of a foam layer on top of a boiling pot. This condition resulting in decreased heat transfer and super heating of the contained fluid. Consequently, a need has been felt for providing a method or manner for increasing heat flops or maintaining heat flops during both preheat and boil periods within a cooking vessel in order to prevent an insulative foam layer which causing super heating thereby boiling over.

SUMMARY OF THE INVENTION

It is therefore an object of the present invention to provide an improved kitchen utensil which prevents the boiling over of a cooking pot.

It is another object of the present invention to provide an improved kitchen utensil which prevents the boiling over of a cooking pot and can be used with standard, existing, and readily available cookware.

It is yet another object of the present invention to provide an improved kitchen utensil which prevents the boiling over of a cooking pot and can be utilized along with cooking pots of a variety of sizes and shapes.

It is a feature of the present invention to provide an apparatus which prevents a large insulative layer of foam from forming thereby causing super heating of a boiling fluid.

Briefly described according to the preferred embodiment of the present invention, the boiling pot over flow prevention apparatus is disclosed comprised of a flexible, directional nozzle focussing a direct stream of cool air directly downward into a boiling pot. A stabilized base is provided to contain a fan unit, and has inlet vent structures. The fan unit is battery operated and is activated to draw cool air into the inlet vent structures and out through the flexible, directional nozzle and through a focusing aperture. When placed next to a boiling pot the flexible, directional nozzle can be conformed to direct an airflow downward into the pot. By activating the fan unit a smooth steady stream of cool air can be drawn in and directed into the pot. This air flow operates both to disburse the foam that is generated as well as to stabilizing and maintaining the heat flux through and out from the top of the boiling pot.

An advantage of the present invention is that it can be utilized with any existing cooking utensil.

Another advantage of the present invention is that it can be used in conjunction with existing kitchen utensils in a non-contact manner thereby eliminating the need for clean up of the apparatus itself.

Yet another advantage of the present invention is that it can put you in a hands free manner thereby allowing to let you attend to other kitchen matters.

Finally, a further advantage of the present invention is that it allows a user the opportunity to boil a fluid at a higher temperature without the risk of boil over making cooking quicker and clean up easier.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

DESCRIPTION OF THE PREFERRED EMBODIMENTS

1. Detailed Description of the Figures

Figure 1:
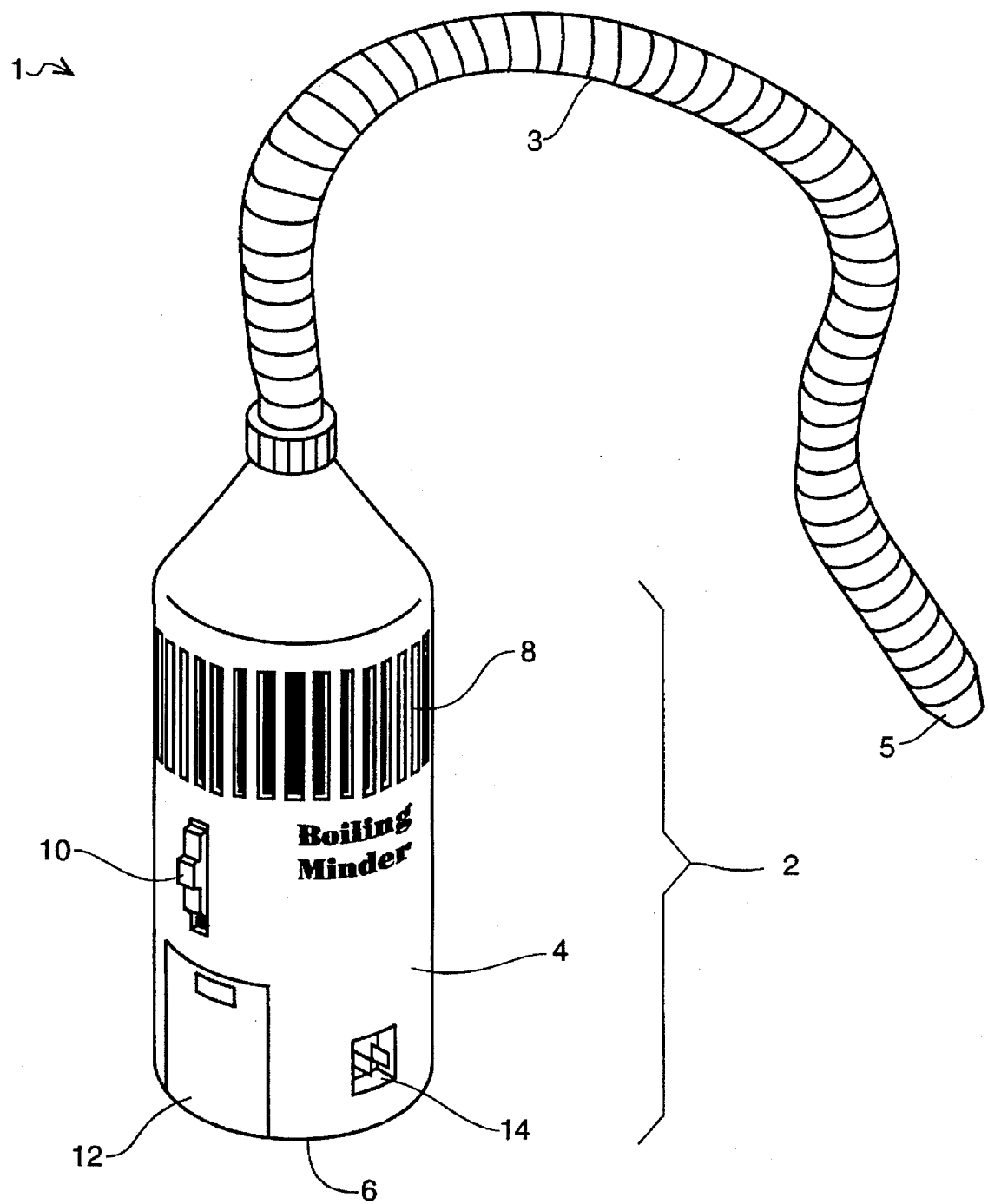
FIG. 1 is a isometric view of a boiling pot fan according to the preferred embodiment of the present invention described.

Referring now to FIG. 1, a boiling pot overflow prevention apparatus 1 is shown, according to the present invention, comprising generally a cylindrical housing 2 and a flexible, directional nozzle 3. The flexible, directional nozzle 3 terminates in a focusing aperture 5. The cylindrical housing 2 consists of a stabilized base 4 having a flat, standable bottom surface 6. The cylindrical housing 2 also contains and forms a series of inlet vent structures 8, which provide an adequate free flow of ventilation air into the housing 2. An on/off switch 10, a battery access door 12, and an AC adapter plug 14 are also accessible from the housing 2.

Figure 2:
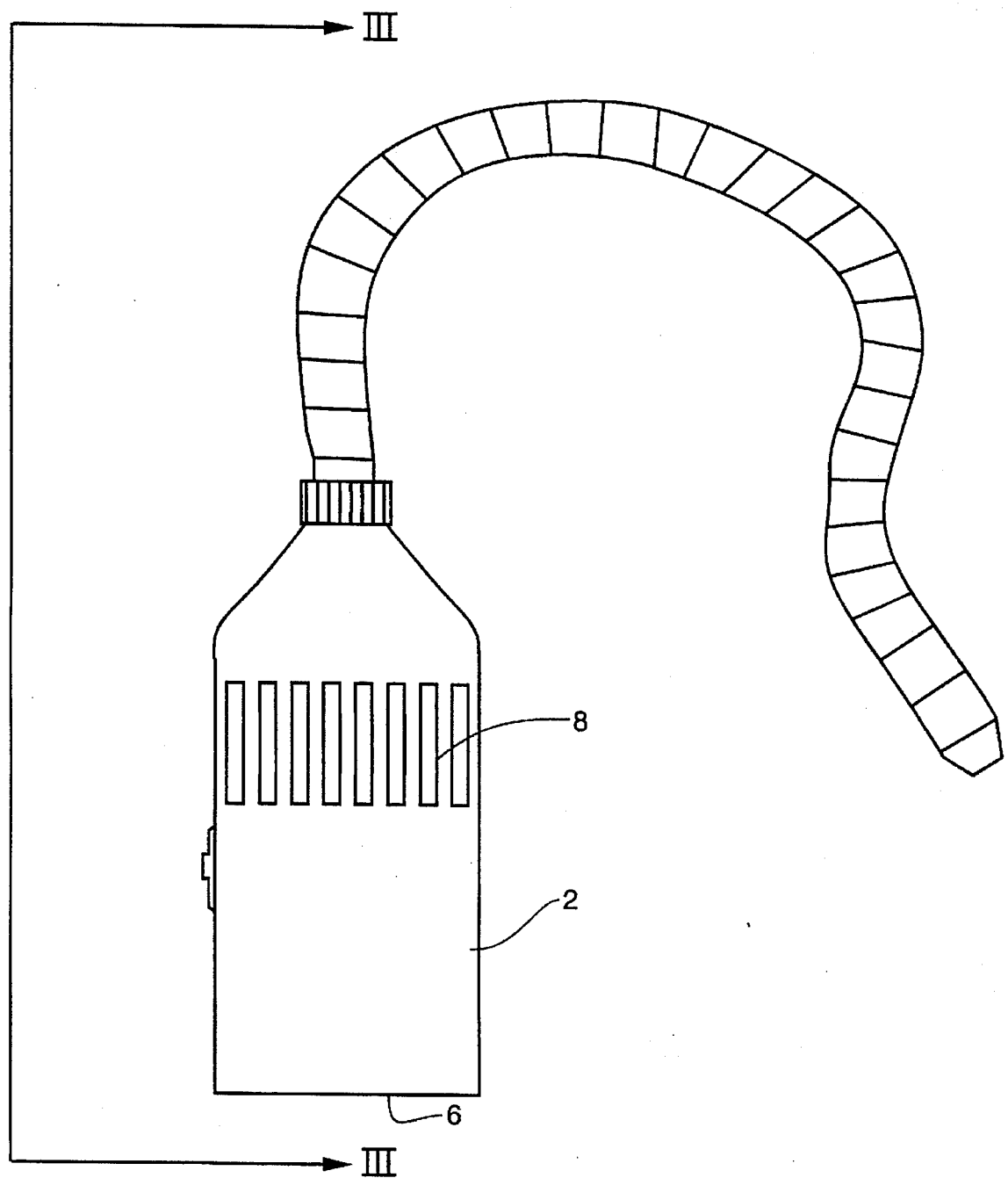
FIG. 2 is a side view thereof.

Referring to FIG. 2, the standable bottom surface 6 of the housing 2 is shown in more detail. The inlet vent structures 8 are located above the standable bottom surface 6 such as to allow for the free, unobstructed flow of inlet air through the inlet vent structures 8.

Figure 3:
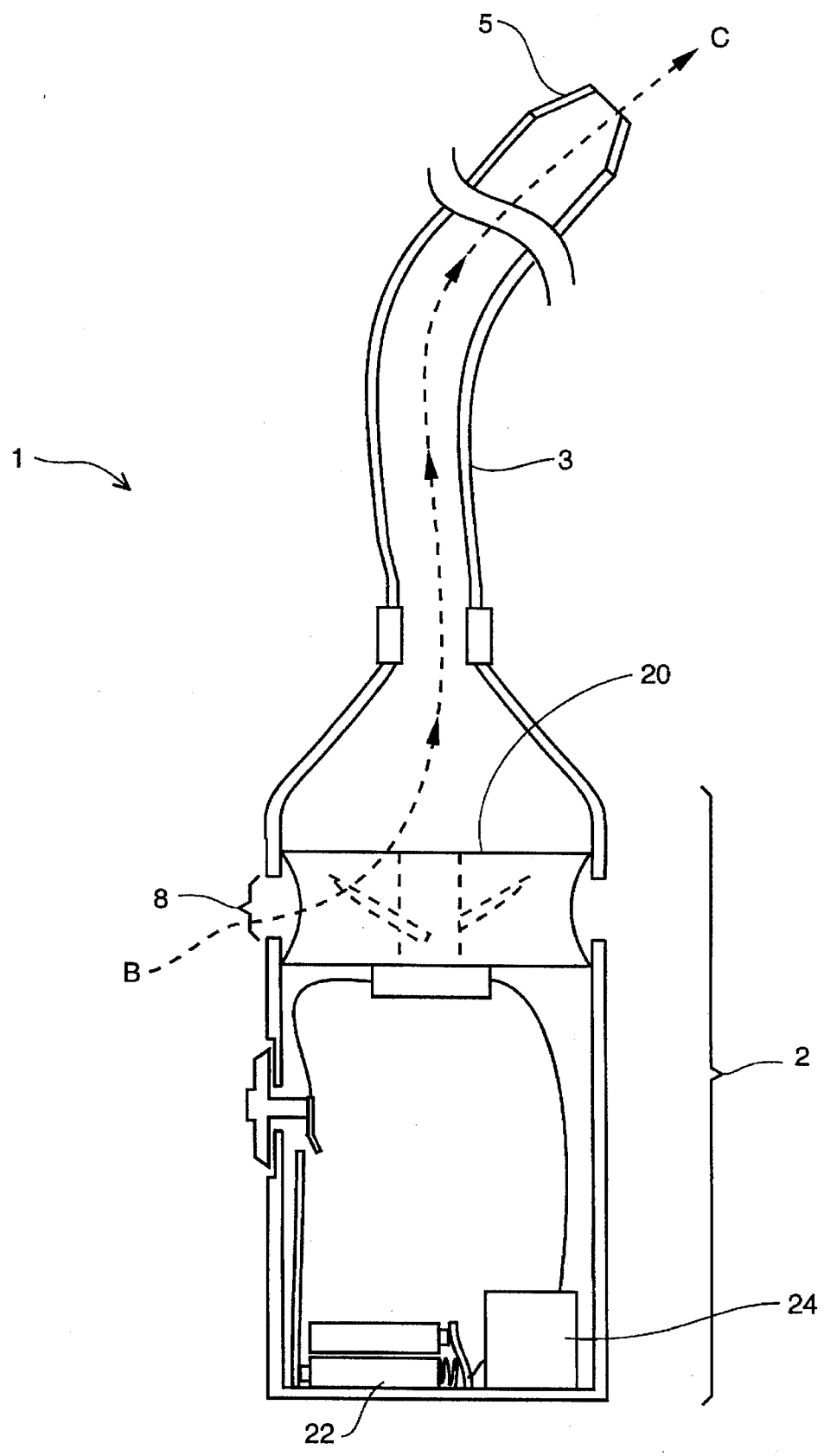
FIG. 3 is a cross sectional view thereof taken along the lines II—II of FIG. 2.

FIG. 3 shows a cross-sectional view of the boiling pot overflow prevention apparatus 1 drawn along line III—III in FIG. 2. The housing 2 not only forms a plurality of inlet vent structures 8, but also contains a fan unit 20. The fan unit 20 is operated from batteries 22, or from a transformer 24 in a conventional manner. The fan unit 20, when engaged, draws ventilation air in through the plurality of inlet vent structures 8, up through the flexible, directional nozzle 3, and out through the focusing aperture 5, as shown by directional lines B–C.

2. Operation of the Preferred Embodiment

According to its preferred embodiment, the present invention comprises a mechanical device which blows ambient air onto the surface of boiling liquids. The directed air stream displaces the steam and dissipates the bubbles that form under high temperature conditions on the surface of a boiling liquid.

Figure 4:
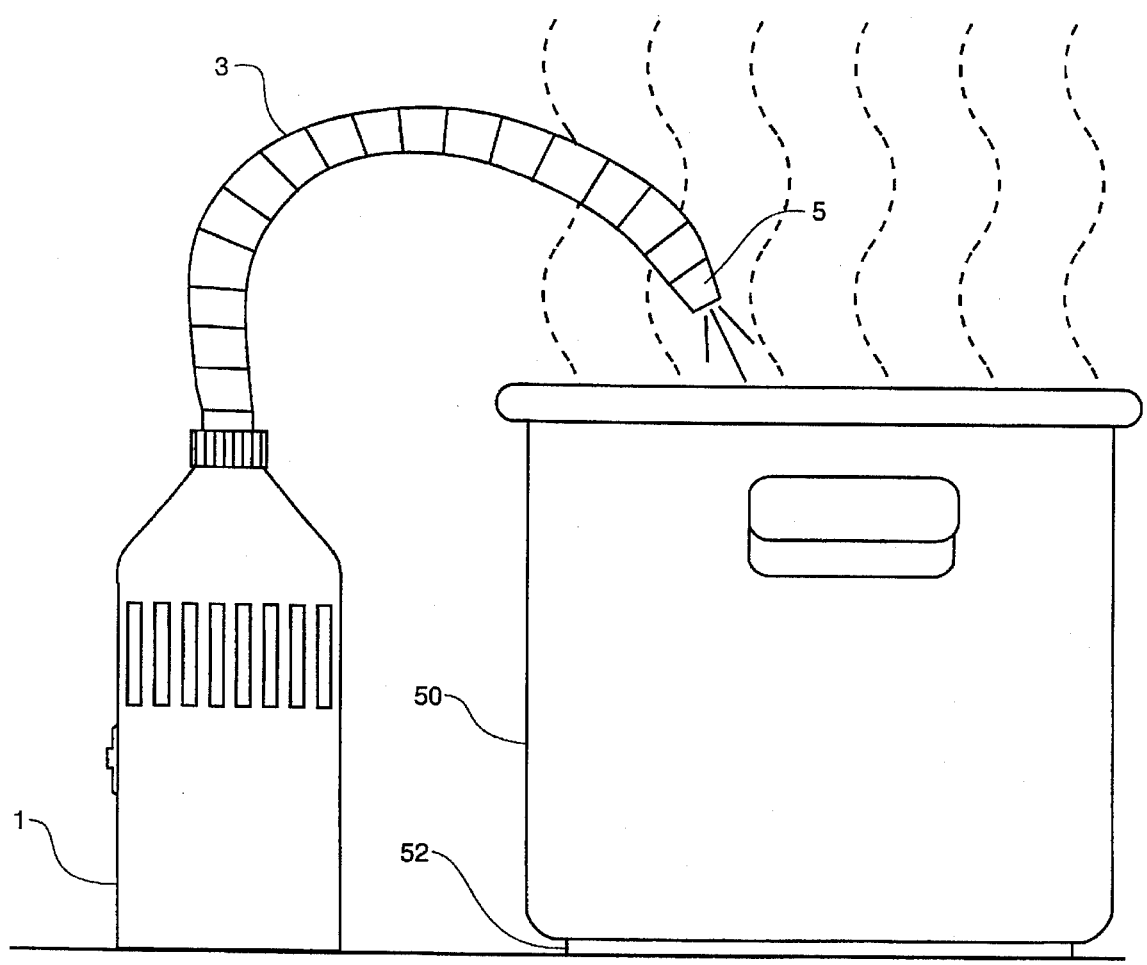
FIG. 4 is a side view of the present invention in use with the pot of boiling fluid.

To use the present invention in accordance with its preferred embodiment, as shown in FIG. 4, a pot 50 of sufficient size is filled with water to within approximately 1½ inch from the top of the pot 50. The pot 50 is placed on a stove burner 52, or other heating element. When the water begins to boil vigorously, the food to be cooked, such as noodles, for example, are placed into the pot. The boiling pot overflow prevention apparatus 1 is then activated by switching the on/off switch into the "on" position. Either batteries, or the AC adapter can be utilized to power the boiling pot overflow prevention apparatus 1. The flexible, directional nozzle 3 is then positioned such that the focusing aperture 5 directs the airstream into the pot 50 from a position on the edge of the pot 50.

The foregoing description is included to illustrate the operation of the preferred embodiment and is not meant to limit the scope of the invention. The scope of the invention is to be limited only by the following claims.

What is claimed is:

1. An apparatus for dissipating bubbles that form on a surface of a boiling liquid in a cooking vessel to prevent overflow, the apparatus comprising:

a housing containing at least one vent structure;

a directionally flexible, hollow, elongated nozzle having an opening at a distal end of said nozzle, said nozzle being in fluid communication with said vent structure;

a fan unit contained within said housing for communicating ventilation air between said inlet vent structure and said nozzle;

a fan power and engagement means for powering and selectively engaging said fan unit; and a focusing aperture terminating said opening of said nozzle for restricting and focusing exit air flow at the surface of the boiling liquid, the focusing aperture having an inlet and an outlet, the inlet being larger than the outlet.

* * * * *